United States Patent
Wu et al.

(10) Patent No.: US 9,871,603 B2
(45) Date of Patent: *Jan. 16, 2018

(54) OFDM SYSTEM WITH REVERSE LINK INTERFERENCE ESTIMATION

(71) Applicant: APPLE INC., Cupertino, CA (US)

(72) Inventors: Jianming Wu, Kanata (CA); Wen Tong, Ottawa (CA); Peiying Zhu, Kanata (CA)

(73) Assignee: APPLE INC., Cupertino, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/923,090

(22) Filed: Oct. 26, 2015

(65) Prior Publication Data

US 2016/0043816 A1    Feb. 11, 2016

Related U.S. Application Data

(63) Continuation of application No. 13/848,317, filed on Mar. 21, 2013, now Pat. No. 9,173,114, which is a
(Continued)

(51) Int. Cl.
    *H04K 1/10*      (2006.01)
    *H04L 27/28*      (2006.01)
(Continued)

(52) U.S. Cl.
    CPC .......... *H04B 17/336* (2015.01); *H04B 17/309* (2015.01); *H04B 17/382* (2015.01); *H04L 1/0003* (2013.01); *H04L 1/0009* (2013.01); *H04L 1/20* (2013.01); *H04L 5/023* (2013.01); *H04L 27/2647* (2013.01); *H04W 24/02* (2013.01); *H04W 24/08* (2013.01);
(Continued)

(58) Field of Classification Search
    CPC .... H04B 17/309; H04B 17/382; H04B 17/26; H04B 17/345; H04L 1/0003; H04L 1/0009; H04L 1/20; H04L 5/023; H04L 1/0026; H04W 24/02; H04W 24/08
See application file for complete search history.

(56) References Cited

U.S. PATENT DOCUMENTS

| | | | |
|---|---|---|---|
| 2003/0072395 A1* | 4/2003 | Jia | .......................... H04L 1/0003 375/341 |
| 2004/0076112 A1* | 4/2004 | Chen | ..................... H04L 25/022 370/208 |

(Continued)

*Primary Examiner* — Shaq Taha
(74) *Attorney, Agent, or Firm* — Fay Kaplun & Marcin, LLP

(57) ABSTRACT

A new method of performing interference estimation to allow the data packets to be efficiently delivered in an OFDM system. The interference estimation is performed on average over each frame for each mobile station individually in both frequency and time domains. Based on the estimated interference, the CIR can be determined by the BTS based on channel response estimates made by the BTS, or by the MS based on channel response estimates made for the uplink assuming a symmetrical channel. Numerical results show that the CIR estimation error could be very small if a sub-channel is considered as the minimum transmission unit. In terms of the aggregate throughput, the interference estimation method can provide a significant gain.

20 Claims, 13 Drawing Sheets

Related U.S. Application Data continuation of application No. 12/965,273, filed on Dec. 10, 2010, now Pat. No. 8,411,772, which is a continuation of application No. 11/791,339, filed as application No. PCT/CA2005/001571 on Oct. 14, 2005, now Pat. No. 7,860,176.

(60) Provisional application No. 60/634,524, filed on Dec. 10, 2004.

(51) Int. Cl.

| | |
|---|---|
| *H04B 17/336* | (2015.01) |
| *H04L 1/00* | (2006.01) |
| *H04L 1/20* | (2006.01) |
| *H04L 5/02* | (2006.01) |
| *H04L 27/26* | (2006.01) |
| *H04W 24/02* | (2009.01) |
| *H04B 17/309* | (2015.01) |
| *H04B 17/382* | (2015.01) |
| *H04W 24/08* | (2009.01) |
| *H04L 1/06* | (2006.01) |
| *H04B 17/26* | (2015.01) |
| *H04B 17/345* | (2015.01) |

(52) U.S. Cl.
CPC ............ *H04B 17/26* (2015.01); *H04B 17/345* (2015.01); *H04L 1/0026* (2013.01); *H04L 1/0643* (2013.01)

(56) References Cited

U.S. PATENT DOCUMENTS

2004/0100939 A1* 5/2004 Kriedte .................... H04L 1/06 370/347
2005/0041622 A1* 2/2005 Dubuc ................. H04L 1/0026 370/332

* cited by examiner

OFDM SYSTEM WITH REVERSE LINK INTERFERENCE ESTIMATION

FIELD OF THE INVENTION

The invention generally relates to the field of wireless communications, and more specifically to reverse link OFDM (orthogonal frequency division multiplexing) wireless communications.

BACKGROUND OF THE INVENTION

Due to the continual growth of wireless internet, there is a high demand for high data rate wireless transmission. Recently, to meet this demand, OFDM systems such as described in Richard Van Nee and Ramjee Prasad, OFDM for Wireless Multimedia Communications, Artech House, Boston-London, 2000 have been widely researched and developed in the IEEE standards IEEE 802.11a, Supplement to IEEE standard for Information Technology, Part-11: Wireless LAN Medium Access Control (MAC) and Physical Layer (PRY) specifications, Sep. 16, 1999, and IEEE 802.16-REVd/D5-2004, Draft IEEE Standard for Local and Metropolitan Area networks, Part 16: Air Interface for Fixed Broadband Wireless Access Systems, May 2004. On the forward-link, these standards provide efficient solutions for high data rate transmission, using reported carrier-to-interference ratio (CIR) information to select proper adaptive modulation coding (AMC) and active mobile stations.

SUMMARY OF THE INVENTION

For reverse link transmissions, the average interference received at a base station is estimated for each mobile station on an OFDM channel. This is used to generate an estimate of received CIR for each mobile station. The estimated CIR can be used for many purposes such as AMC determination and mobile station scheduling.

According to one aspect of the present invention, there is provided a method comprising: determining an interference estimate of an interference component of an OFDM signal received from a mobile station; using the interference estimate, determining a carrier-to-interference ratio (CIR) for at least one sub-carrier and/or for at least one sub-channel for the mobile station.

According to another aspect of the present invention, there is provided a method for execution by a mobile station comprising: receiving an interference estimate of an interference component of a received version of an OFDM signal transmitted by the mobile station; using the interference estimate, determining a carrier-to-interference ratio (CIR) for at least one sub-carrier and/or for at least one sub-channel for the mobile station.

According to still another aspect of the present invention, there is provided an apparatus comprising: an interference estimator adapted to determine an interference estimate of an interference component of an OFDM signal received from a mobile station; a CIR estimator adapted to use the interference estimate to determine a carrier-to-interference ratio (CIR) for at least one sub-carrier and/or for at least one sub-channel for the mobile station.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

In the reverse link, the interference received by a serving base station can change significantly over time, and the value between different times can fluctuate by more than 10 dB in some systems. This is due to the randomness with which mobile stations are transmitting their signals using different timing, scheduling etc.

Figure 1:
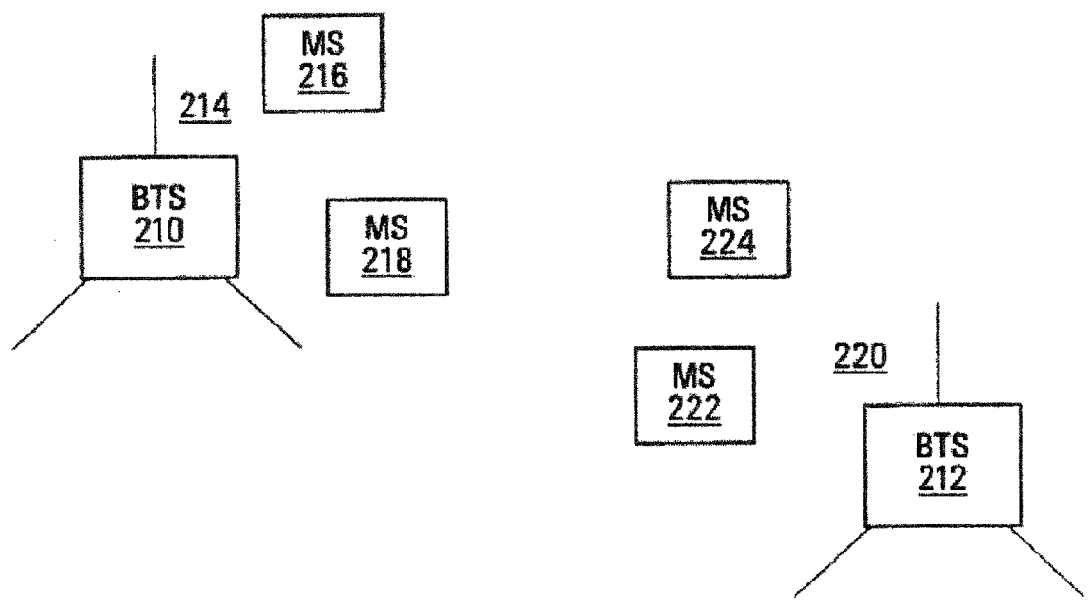
FIG. 1 is system view of an example interference scenario.

Referring to FIG. 1, shown is an example of an interference scenario. Two sectorized BTSs (base stations) 210,212 are shown. Sector 214 of base station 210 is shown serving two MSs (mobile stations) 216,218. There is no interference between these two mobile stations 216,218 because their transmissions are under the control of the base station 210, and can be separated either in terms of time (e.g. time division multiplexing) or frequency by assigning different sets of OFDM subcarriers to each mobile station. Sector 220 of base station 212 is also shown serving two mobile stations 222,224. Mobile stations 222,224 do not interfere with each other for the same reasons described above for mobile stations 216,218. However, the transmissions of mobile stations 222,224 can be a source of interference to the transmission of mobile stations 216,218 and vice versa. Since the base station 210 and mobile stations 216,218 are not aware of how many interfering mobile stations there are, or of when the interfering mobile stations are transmitting, it is difficult to get an accurate estimate of interference.

In OFDM systems, an OFDM frequency band of interest is used to transmit a set of closely spaced tones referred to as sub-carriers. An OFDM symbol is transmitted over a symbol duration. The transmit capacity of such a set of sub-carriers is typically divided into sub-channels. There are many different sub-channel definitions. For example, a sub-channel can be a contiguous block of sub-carriers. An example of this is the so-called AMC sub-channel defined in IEEE 802.16d. A sub-channel can be a set of blocks of sub-carriers each of which contains contiguous sub-carriers.

An example of this is the so-called diversity sub-channel also defined in IEEE 802.16d. A sub-channel can be a set of sub-carriers that are scattered throughout the entire OFDM frequency band. An example of this is the so-called FUSC (full usage of sub-channel) also defined in IEEE 802.16d. A sub-channel can be a set of sub-carriers that are scattered throughout only a part of the entire OFDM frequency band. An example of this is the so-called PUSC (partial usage of sub-channel) also defined in IEEE 802.16d.

Typically, each transmitting mobile station is assigned one or multiple sub-channels. The sub-channel definition in adjacent coverage areas may be the same or different. The assignment of sub-channels to mobile stations will typically vary from symbol to symbol. In some sub-channel definitions, the sub-channels with the same index in different sectors consist of different sub-carriers due to the different initialization which gives different sub-channel patterns. Therefore, the user receives interferences over a sub-channel that come from many users.

In OFDM systems, while the interference on a particular sub-carrier is un-predictable, the interference averaged over a set of carriers forming a sub-channel can be relatively stable and can be predicted based on previous received interferences.

Figure 2A:
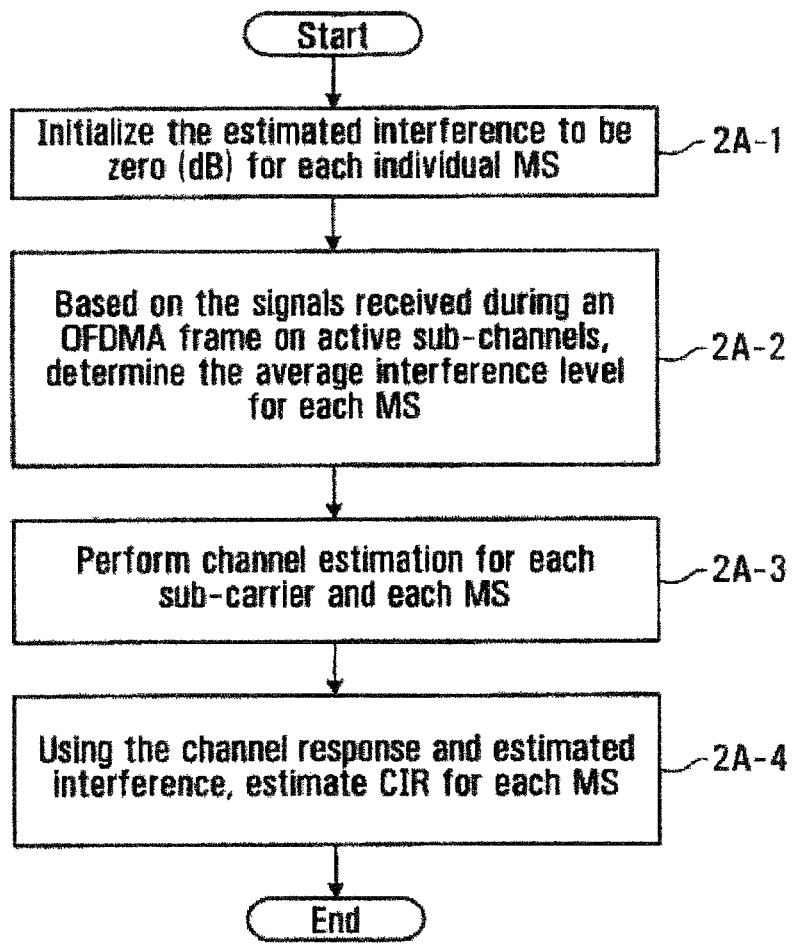
FIGS. 2A through 2C are flowcharts of example methods of performing carrier-to-interference ratio estimation as provided by embodiments of the invention.
Figure 2B:
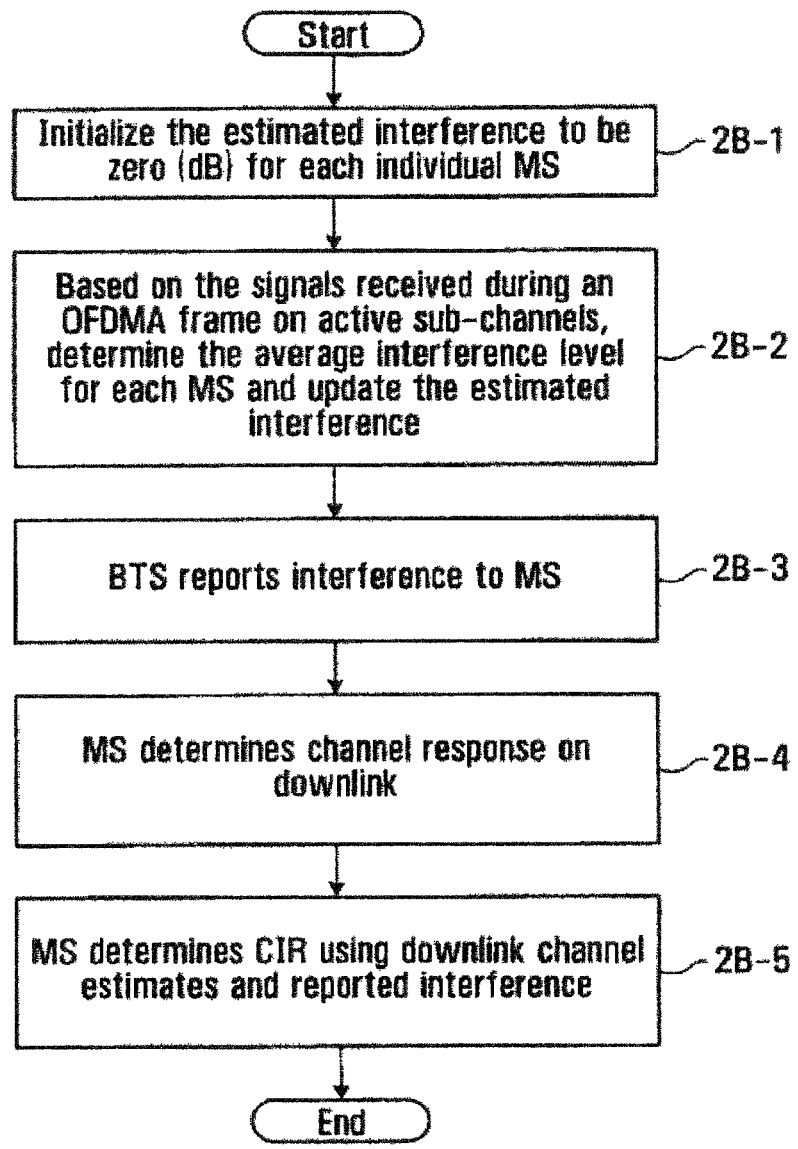
Figure 2C:
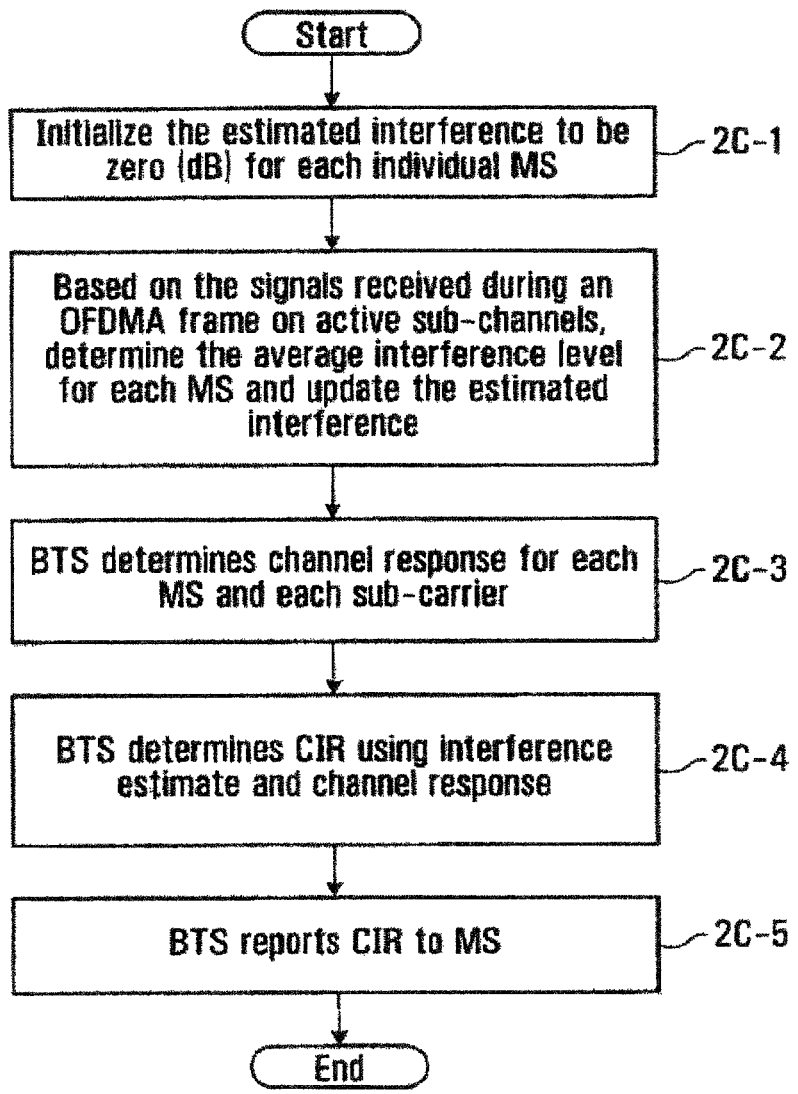

Referring now to FIG. 2A, an example interference estimation method provided by an embodiment of the invention will now be described. For the embodiment of FIG. 2A, there is no specificity as to where each of the steps are implemented. For example, they can be implemented by an MS or a BTS as may be appropriate for a given application. FIGS. 2B and 2C are specific examples of how the steps might be implemented in TDD (time division duplex) and FDD (frequency division duplex) systems, respectively.

The method begins at step 2A-1 with initializing the estimated interference to be zero (dB) for each individual mobile station. At step 2A-2, based on the signals received during an OFDM frame (defined to be some number of OFDM symbols) on active sub-channels, an average interference level for each mobile station is determined. Preferably, a long term average is generated by combining the current values with previous interference estimates, for example by using a linear filter. At step 2A-3, a channel estimate is generated for each mobile station and for each sub-carrier. At step 2A-4, using the estimated channel response and reported interference, an estimated CIR is determined for each MS, and preferably for each individual sub-carrier and then for each sub-channel. The estimated CIR is then available for use, for example for AMC determination and/or channel selection.

Referring now to FIG. 2B, an example interference estimation method provided by an embodiment of the invention will now be described that is particularly applicable to a TDD environment. Steps 2B-1 and 2B-2 are the same as steps 2A-1 and 2A-2 described above. At step 2B-3, the BTS reports the interference estimate to each mobile station. At step 2B-4, the MS determines channel response for the downlink for each sub-carrier. In a TDD system, the channel response is symmetrical, so the downlink channel response can be used as estimates for the uplink. At step 2B-5, using the estimated channel response and reported interference, each mobile station determines an estimated CIR for each individual sub-carrier and then for each sub-channel. The estimated CIR is then available for use, for example for AMC determination and/or mobile station.

Referring now to FIG. 2C, an example interference estimation method provided by an embodiment of the invention will now be described that is particularly applicable to an FDD environment. Note that this approach can also applied in a TDD environment. Steps 2C-1 and 2C-2 are the same as steps 2A-1 and 2A-2 described above. At step 2C-3, the BTS estimates a channel response for each mobile station and each sub-carrier. At step 2C-4, using the estimated channel response and reported interference, each BTS determines an estimated CIR for each individual sub-carrier and then for each sub-channel. At step 2C-5, the estimated CIR is reported to the mobile station. The estimated CIR is then available for use, for example for AMC determination and/or mobile station.

The following is a mathematical formulation of an example implementation of the interference estimation method.

The received power for the desired signal component (i.e. not including the interfering components) for the k-th mobile station on the i-th sub-carrier and the l-th sub-channel in the m-th frame is $P_{k,i,l}(m)$.

The received power of interference and noise for the k-th mobile station on the i-th sub-carrier and the l-th sub-channel in the m-th frame is $I_{k,i,l}(m)$.

The actual average CIR for the k-th mobile station on the i-th sub-carrier and the l-th sub-channel in the m-th frame is $\Gamma_{k,i,l}(m)$. This can be expressed as follows:

$$\Gamma_{k,i,l}(m) = \frac{P_{k,i,l(m)}}{I_{k,i,l(m)} + N_o}$$

where $P_{k,i,l}(m)$ is the signal power, $I_{k,i,l}(m)$ is the interference power and $N_o$ is the noise which will be discounted in the math that follows as it is an easily removable contribution. Using the CIR, $I_{k,i,l(m)}$ can be expressed as $$I_{k,i,l}(m) = \frac{P_{k,i,l}(m)}{\Gamma_{k,i,l}(m)}.$$

More practically, $I_{k,i,l}(m)$ can be expressed in terms of a total received power $P_{received,k,i,l}(m)$ on a particular sub-carrier and the desired signal component power $P_{k,i,l}(m)$ as follows:

$$P_{received,k,i,l}(m) = I_{k,i,l}(m) + P_{k,i,l}(m)$$

This can be rearranged to yield the following expression for $I_{k,i,l}(m)$:

$$I_{k,i,l}(m) = P_{received,k,i,l}(m) - P_{k,i,l}(m)$$

In the above expression, $P_{received,k,i,l}(m)$ is measurable at the receiver, and $P_{k,i,l}(m)$ can determined from pilot channel signal strength measurements. For example, in each sub-channel, there may be data tones and pilot tones depending on sub-channelization type. For example, in IEEE 802.16d, the AMC sub-channel consists of 48 data tones and 24 pilot tones. Those pilot tones can be used for many purposes such as signal strength measurements and channel response estimation. The interpolation between neighboring pilot tones is used to figure out the information for data tone.

The received power of interference and noise averaged over N sub-carriers and L sub-channels for the k-th mobile station in the m-th frame is $\bar{I}_k(m)$ and can expressed as $$\bar{I}_k(m) = \frac{1}{LN} \sum_{l=0}^{L-1} \cdot \sum_{i=0}^{N-1} I_{k,i,l}(m).$$

The pilot sub-carriers are preferably omitted from this calculation. If the pilot sub-carriers are omitted, then the above expression can be simplified to:

$$\bar{I}_k(m) = \frac{1}{LN}(P_{received,tot} - P_{desired\_signal,tot})$$

where $P_{received,tot}$ is the total received power over the N sub-carriers and L sub-channels for the k-th mobile station, $P_{received,pilot}$ is the total received pilot power over the N sub-carriers and L sub-channels for the k-th mobile station, $P_{desired\_signal,tot}$ is the total received desired signal power over the N sub-carriers and L sub-channels for the k-th mobile station.

The estimated power of interference and noise for the k-th mobile station in the (m+1)-th frame is $\hat{I}_k(m+1)$, which can be represented by a linear filter $$\hat{I}_k(m+1) = \hat{I}_k(m) \cdot (1-\alpha) + \bar{I}_k(m) \cdot \alpha$$

where $\alpha$ is a filter coefficient and $0<\alpha \leq 1$. Other filter designs/extrapolation designs can be employed.

The estimated CIR for the k-th mobile station on the i-th sub-carrier and the l-th sub-channel in the (m+1)-th frame is $\hat{\Gamma}_{k,i,l}(m+1)$ and can be calculated as $$\hat{\Gamma}_{k,i,l}(m) = \frac{\tilde{P}_{k,i,l}(m)}{\hat{I}_k(m)}.$$

where $\tilde{P}_{k,i,l}(m)$ is the reported or estimated desired signal component power for the k-th mobile station on the i-th sub-carrier and the l-th sub-channel in the m-th frame. The estimated CIR for the k-th mobile station on the l-th sub-channel in the (m+1)-th frame is $\hat{\Gamma}_{k,l}(m+1)$ and can be calculated as $$\hat{\Gamma}_{k,l}(m) = \frac{\sum_{i=0}^{N-1}\tilde{P}_{k,i,l}(m)}{N \cdot \hat{I}_k(m)}.$$

As indicated above, the transmissions from each mobile station include one or more pilot sub-carriers. When the BTS receives the pilots, there will also usually be interference from the mobile stations served by neighboring sector. An exception to this is PUSC where neighbouring sectors use different sets of sub-carriers. The pilot sub-carriers are used in order to estimate the channel for the pilot sub-carriers, and interpolation can be performed to determine the channel for every sub-carrier.

Note that $\tilde{P}_{k,i,l}(m)$ can be determined based on received pilots by subtracting the channel response from a known transmit power. This channel response information can be forwarded to the mobile station, and the mobile station will know the power it used to transmit. Alternatively, the base station may also know the power that the mobile station used to transmit if it is controlling that power through power control.

In a particular example, each mobile station transmits using the same power on all sub-carriers, in which case the transmit power is a single value $C_k(m)$ (i.e. for kth mobile station during mth frame). This value may be subject to power control in some implementations. The base station can then determine $\tilde{P}_{k,i,l}(m)$ according to $\tilde{P}_{k,i,l}(m) = C_k(m) \cdot H_{k,i,l}(m)$, where $H_{k,i,l}(m)$ is the channel response information. Alternatively, the mobile station can make this determination if the channel information is fed back from the base station, or can be derived from other information fed back from the base station.

Interference estimation for a given mobile station is based on interference measurements/estimates for the assigned sub-carriers/sub-channels of the previous frame in combination with earlier estimates. CIR estimates on the other hand can be generated for either currently assigned sub-carriers/sub-channels, for example to assist in AMC decisions, or for potentially assigned sub-carriers/sub-channels, to assist in sub-channel selection for example.

In other words, the CIR estimate can be determined for a different set of sub-channels/sub-carriers than was used in generating the interference estimate.

If the CIR calculation is done in the MS, MS knows transmit signal strengths and can interpolate previous channel responses to get channel response estimates for currently/potentially assigned sub-carriers/sub-channels to get the desired signal strength needed for the CIR calculation. In a TDD system, the MS can do this calculation using channel responses estimated for the uplink since there is a symmetrical channel and hence no channel response feedback is needed.

If the CIR calculation is done by BTS, the BTS needs to make some sort of assumption on transmitted signal strength or otherwise be able to determine the desired signal strength. For example, the BTS might use a known transmit signal strength C, and the interpolated channel response to get desired signal strength needed for the CIR calculation. In this case, BTS estimates the interference and received signal power, and then figures out the average CIR over all the available tones. This CIR will be sent back to MS.

Performance Evaluation

For purposes of performance evaluation of the above derivation, one can assume that the received interference for both real and imaginary parts on each carrier is Gaussian distributed with standard deviations of $\sigma$. Averaging M interferences obtains a complex number with the standard deviation of $\sigma/\sqrt{M}$ for both parts, resulting in the variance of interference of $(2-\pi/2) \cdot \sigma^2/M$. This shows that increasing M will linearly decrease the variance of received interference.

To evaluate how accurate CIR estimation is on each sub-carrier and each sub-channel, an estimation error per sub-carrier is defined as:

$$\Delta_{sub-carrier} = \Gamma_{sub-carrier}^{(real)} - \Gamma_{sub-carrier}^{(est)}$$

and per sub-channel as:

$$\Delta_{sub-carrier} = \Gamma_{sub-carrier}^{(real)} - \Gamma_{sub-channel}^{(est)}$$

where $\Gamma_{sub-carrier}^{real}$, $\Gamma_{sub-carrier}^{(est)}$, $\Gamma_{sub-channel}^{(real)}$ and $\Gamma_{sub-channel}^{(est)}$ represent the real received CIR and estimated CIR per sub-carrier and sub-channel, respectively.

Figure 3:
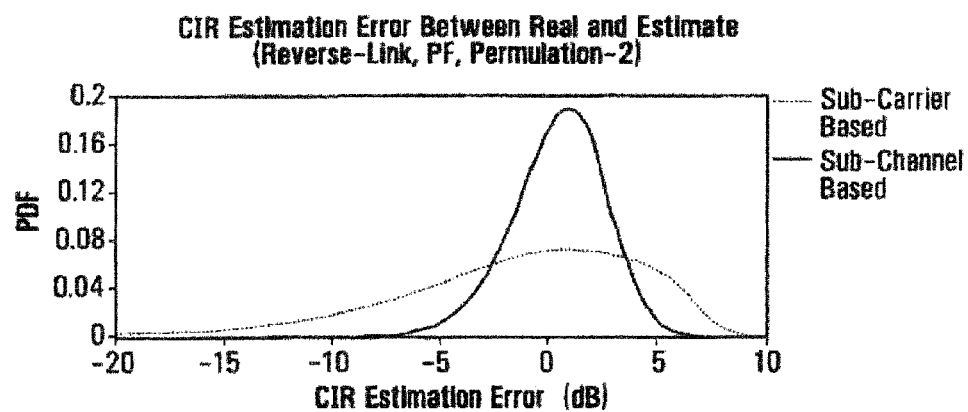
FIG. 3 is a plot of a PDF (probability density functions) of CIR estimation error for an example application.

FIG. 3 shows an example of CIR estimation error between real and estimated CIR for both sub-carrier and sub-channel in the context of an example system described below. From the results of FIG. 3, two observations can be made. First, it can be seen that the standard deviation for sub-carriers is about 6.56 dB while the standard deviation for sub-channels (each sub-channel is composed of 48 sub-carriers) is about 2.42dB. The CIR estimation error for each sub-channel is much smaller than the error for each sub-carrier. This small estimation error may not seriously impact the system level performance due to ARQ (automatic repeat request) processes which may be employed to completely recover some incorrect packets after several retransmissions. Second, the sub-carrier CIR estimation error is extremely high when the received sub-carrier CIR is low. This means that the interference estimation will work best in a higher received sub-carrier CIR region when sub-carrier CIR estimation is required. For sub-channel CIR estimation, however, there is no such a limitation.

System Level Performance

In order to investigate the performance with the proposed interference estimation method, system level simulation based on IEEE 806.16-REVd standard assumptions were performed. In the following, a frame structure for OFDM is described. Then, the simulation assumptions are listed. Finally, the simulation results are presented with detailed discussions.

Frame Structure

Figure 4:
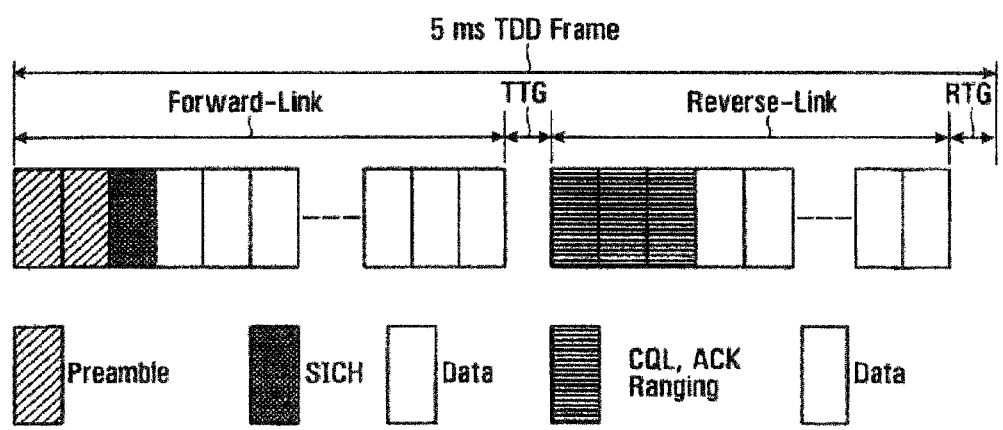
FIG. 4 is an example of a TDD frame structure.

The TDD system is based on wireless MAN-OFDMA PHY in IEEE 806.16-REVd standard and its frame structure with 5 msec frame length is illustrated in FIG. 4.

A detailed frame configuration in terms of the number of symbols, preambles, dedicated control symbols, data symbols is listed in Table 1 below.

TABLE 1

Frame configuration of TDD OFDMA system for 5 msec frame.

| Frame Configuration | Forward-Link | Reverse-Link |
|---|---|---|
| Number of Symbols | 27 | 15 |
| Number of Preambles | 2 | 0 |
| Number Dedicated Control Symbols | 1 | 3 |
| Data Symbols | 24 | 12 |
| Transmission Time | 3.1104 ms | 1.728 ms |
| TDD Protection Time | 121.2 µs | 40.4 µs |
| Effective Bandwidth | 6.3824 MHz | 3.6176 MHz |

Simulation Assumptions

The simulation focuses on the reverse-link and its system level simulation assumptions are listed in Table 2.

TABLE 2

System level simulation assumptions.

| | |
|---|---|
| Number of Cells | 19 |
| Number of mobile stations | 20 |
| FFT/IFFT Size | 1024 |
| Antenna Structure | 1 × 1 |
| Feedback Delay | 1 TDD Frame |
| Maximum Retransmission Number | 3 |
| Entire Bandwidth | 10 MHz |
| Center Frequency | 2.3 GHz |
| Transmission Power | 200 mWatts (23 dBm) |
| Noise Figure | 9 dB |
| Antenna Gain | −1 dBi |
| Maximum CIR | 30 dB |
| Filter Coefficient α | 0.5 |

The relation of AMC determination in terms of channel encoding block length, modulation, channel code rate, and data transmission rate is listed in Table 3.

TABLE 3

AMC set assumption.

| Channel Encoding Block Length (bits) | Number of Sub-channels | Modulation Method | Channel Code Rate |
|---|---|---|---|
| 480 | 10 | QPSK | 1/5 |
| 480 | 10 | QPSK | 1/4 |
| 480 | 10 | QPSK | 1/3 |
| 720 | 15 | QPSK | 1/2 |
| 720 | 15 | QPSK | 2/3 |
| 960 | 20 | QPSK | 3/4 |
| 960 | 20 | QPSK | 4/5 |
| 1440 | 30 | 16 QAM | 1/2 |
| 1440 | 30 | 16 QAM | 2/3 |
| 1920 | 40 | 16 QAM | 3/4 |
| 2160 | 45 | 16 QAM | 4/5 |
| 2880 | 60 | 64 QAM | 2/3 |
| 2880 | 60 | 64 QAM | 3/4 |
| 3600 | 75 | 64 QAM | 4/5 |

Figure 5:
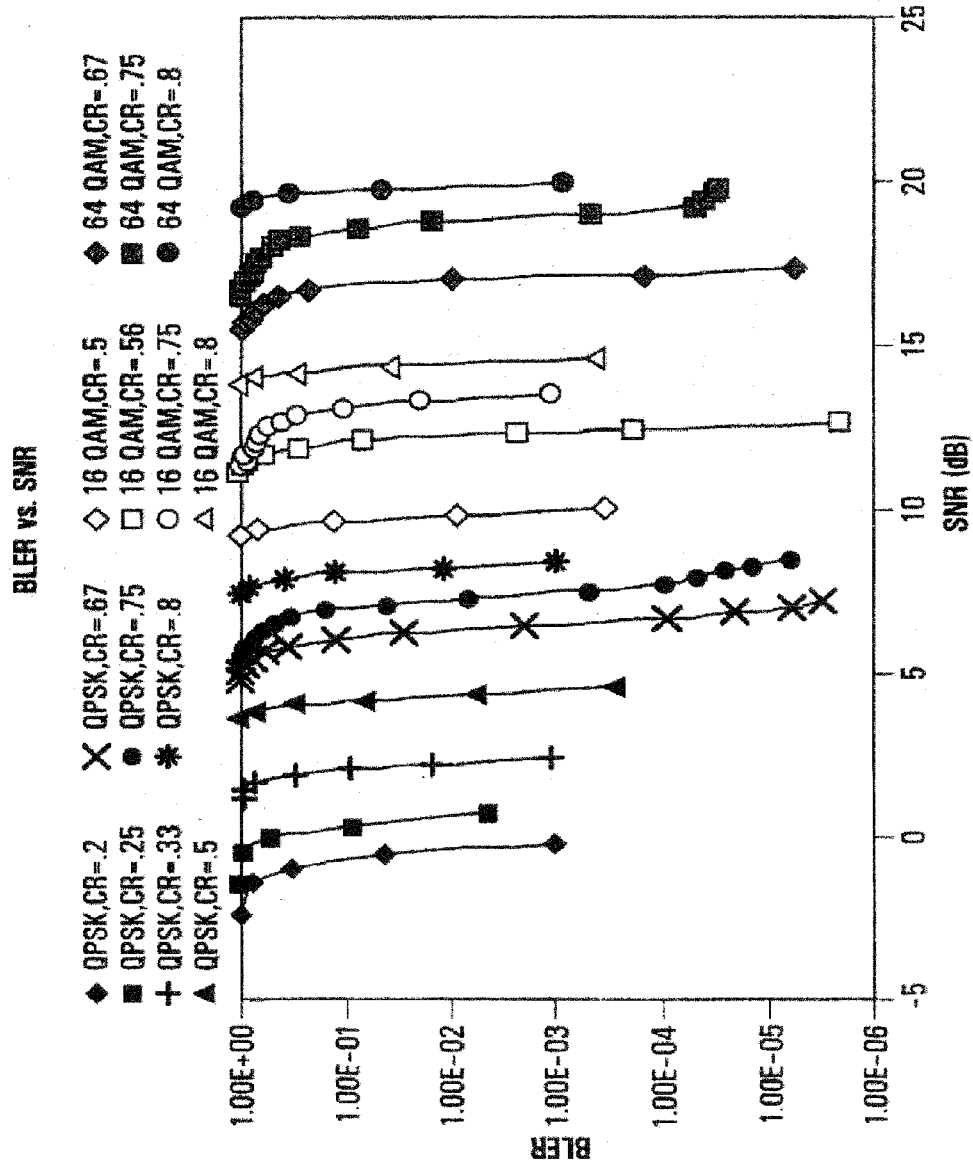
FIGS. 5 through 8 are plots showing example simulation results.

The path-loss model based on ITU vehicular model is represented as $$L=40\times(1-4\times10^{-3}\times15)\cdot\log_{10}R-18\times\log_{10}15+21\times\log_{10}(2.3\times10^3)+80$$

where R is the distance between BTS and mobile station in km. Link-Level Curves for AMC FIG. 5 shows the link-level code sets in terms of BLER versus SNR for a 1×1 structure.

Channel Model and CIR Generation

A mixed channel model with assignment probability as listed in Table 4 is considered in our system level simulation.

TABLE 4

Channel Model.

| Channel Mode | # of fingers | Speed (km/h) | Fading Model | Assignment Probability |
|---|---|---|---|---|
| Model A | 4 | 3 | JTC | 0.2 |
| Model B | 4 | 10 | JTC | 0.2 |
| Model C | 6 | 3 | JTC | 0.15 |
| Model D | 6 | 10 | JTC | 0.15 |
| Model E | 6 | 60 | JTC | 0.3 |

The fading channel generation is based on a JTC model. The CIR calculation is performed on the frequency domain and individually generated for each OFDM tone.

Mobile Station Scheduler and Channel Permutation

Mobile station scheduler for resource allocation is based on either round-robin (RR) or proportional fairness (PF).

Several permutation patterns are used to form the sub-channel as follows:

Permutation-1: This symbol structure (mandatory and diversity channel) supports 35 sub-channels where each transmission uses 48 data carriers as the minimal block of processing. A burst is composed of 3 time symbols and 1 sub-channel, within each burst there are 48 data sub-carriers and 24 fixed-location pilot sub-carriers.

Permutation-2: This symbol structure (optional and diversity channel) supports 48 sub-channels where a sub-channel consists of 48 data carriers and 6 pilot carriers. A burst is composed of 3 time symbols and 1 sub-channel, within each burst there are 48 data sub-carriers and 6 fixed-location pilot sub-carriers.

Permutation-3: This symbol structure belongs to AMC channel. Sub-channel consists of 48 data carriers or 6 contiguous bins. The bin is the set of 9 contiguous subcarriers within an OFDMA symbol.

Performance Discussion

Figure 6:
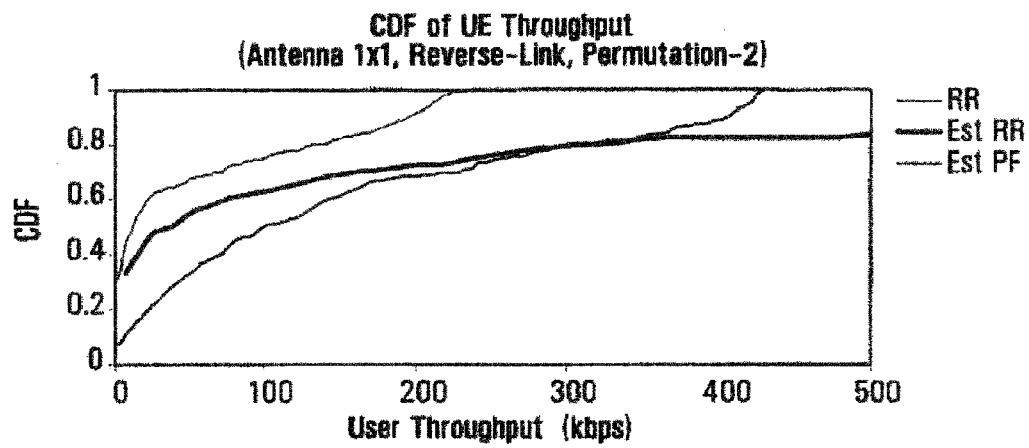

FIG. 6 shows the CDF (cumulative distribution function) of mobile station throughput when we employ 1×1 antenna structure on the reverse-link. It can be seen that the data transmission based on interference estimation method is much better than that without interference estimation. The gain could reach 3.7 if we employ round-robin scheduling and 2.7 if proportional fairness scheduling.

Figure 7:
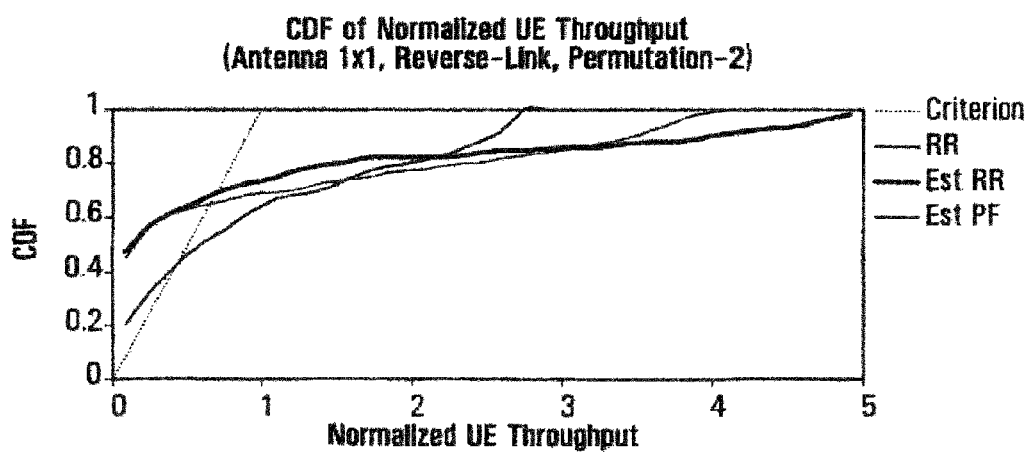

FIG. 7 shows the fairness curves with and without interference estimation when we utilize permutation-2 channel. We may find that the data transmission with interference estimation and proportional fairness scheduling provides the best result but slightly has some degradation on mobile station throughput (see FIG. 6).

Figure 8:
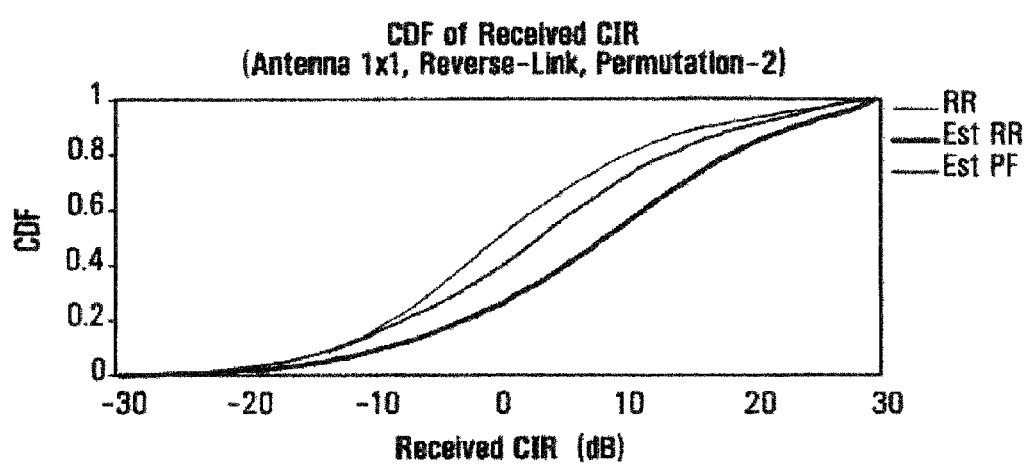

FIG. 8 shows the received sub-channel CIR for each mobile station when we utilize the permutation-2 channel. It can be found that the data transmission with interference estimation and round-robin experiences the best channels while the data transmission with round-robin and no interference estimation experiences the worst channels. This is because the former provides more accurate AMC determination than the latter.

Table 5 and Table 6 list the aggregate throughput per sector and residual FER when we employ different schedulers (round-robin, interference estimation round-robin and interference estimation proportional fairness) and different channel (permutation-1, permutation-2 and permutation-3), respectively. It can be seen that the relative gain achieved by interference estimation approach on three permutation channels are almost the same and between 3 and 4 times as opposed to no interference estimation transmission.

TABLE 5

Aggregate mobile station throughput with difference channels and schedulers.

| | Permutation-1 (Diversity Channel) | Permutation-2 (Diversity Channel) | Permutation-3 (AMC Channel) |
|---|---|---|---|
| RR | 310.65 | 1117.98 | 1055.15 |
| Interference Estimate RR | 1029.96 | 4117.68 | 2919.54 |
| Interference Estimate PF | 1097.6 | 3100.45 | 2136.73 |

TABLE 6

Residual FER with difference channels and schedulers.

| | Permutation-1 (Diversity Channel) | Permutation-2 (Diversity Channel) | Permutation-3 (AMC Channel) |
|---|---|---|---|
| RR | 0.3782 | 0.4087 | 0.4206 |
| Interference Estimate RR | 0.1346 | 0.1068 | 0.1239 |
| Interference Estimate PF | 0.1191 | 0.0876 | 0.1467 |

Figure 9:
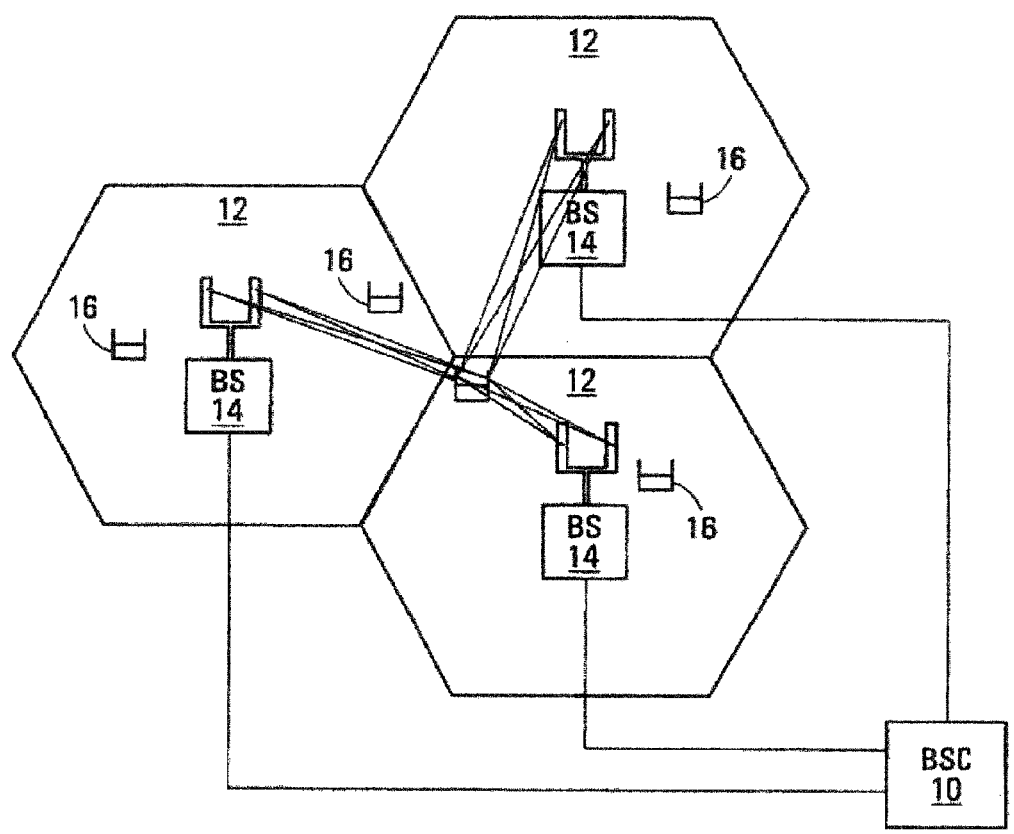
FIG. 9 is a block diagram of an example cellular communication system.

For the purposes of providing context for embodiments of the invention for use in a communication system, FIG. 9 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions. As illustrated, the base stations 14 and mobile terminals 16 may include multiple antennas to provide spatial diversity for communications.

Figure 10:
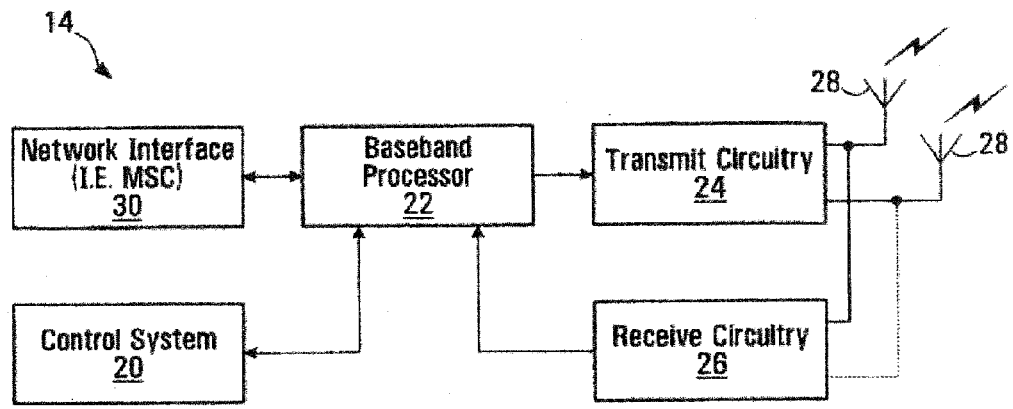
FIG. 10 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 10, an example base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 9). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically involves demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Modulation and processing details are described in greater detail below.

Figure 11:
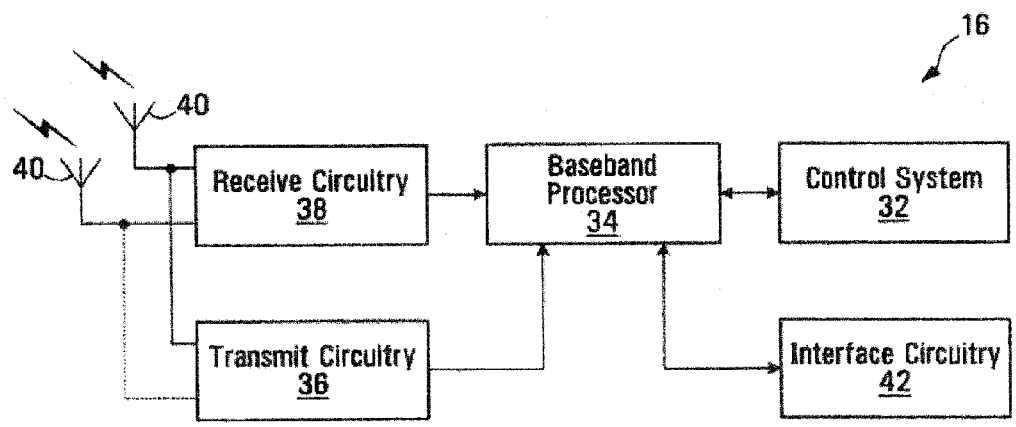
FIG. 11 is a block diagram of an example wireless terminal that might be used to implement some embodiments of the present invention.

With reference to FIG. 11, an example mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically involves demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OfDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 12:
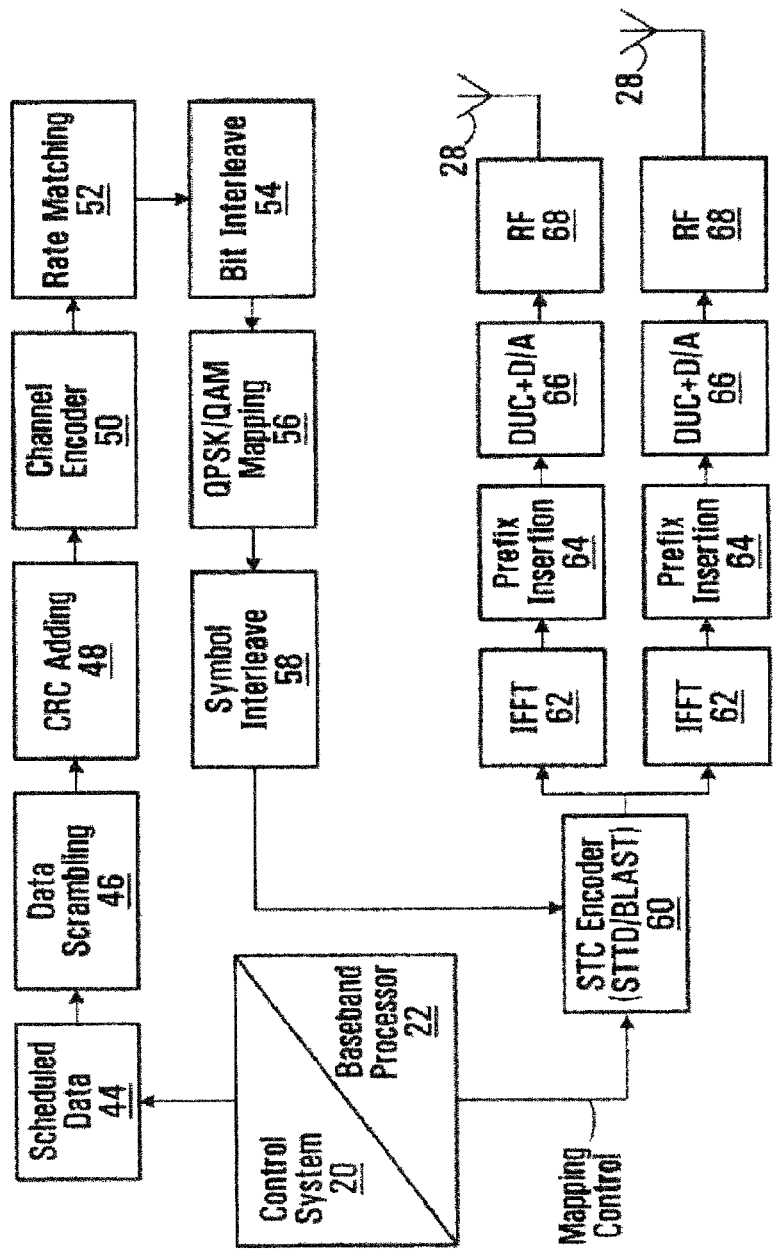
FIG. 12 is a block diagram of a logical breakdown of an example OFDM transmitter architecture that might be used to implement some embodiments of the present invention.

With reference to FIGS. 9 and 12, an example logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 2 may provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processor 62 will preferably operate on the respective symbols to provide an inverse Fourier Transform. The output of the IFFT processor 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUO) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 13:
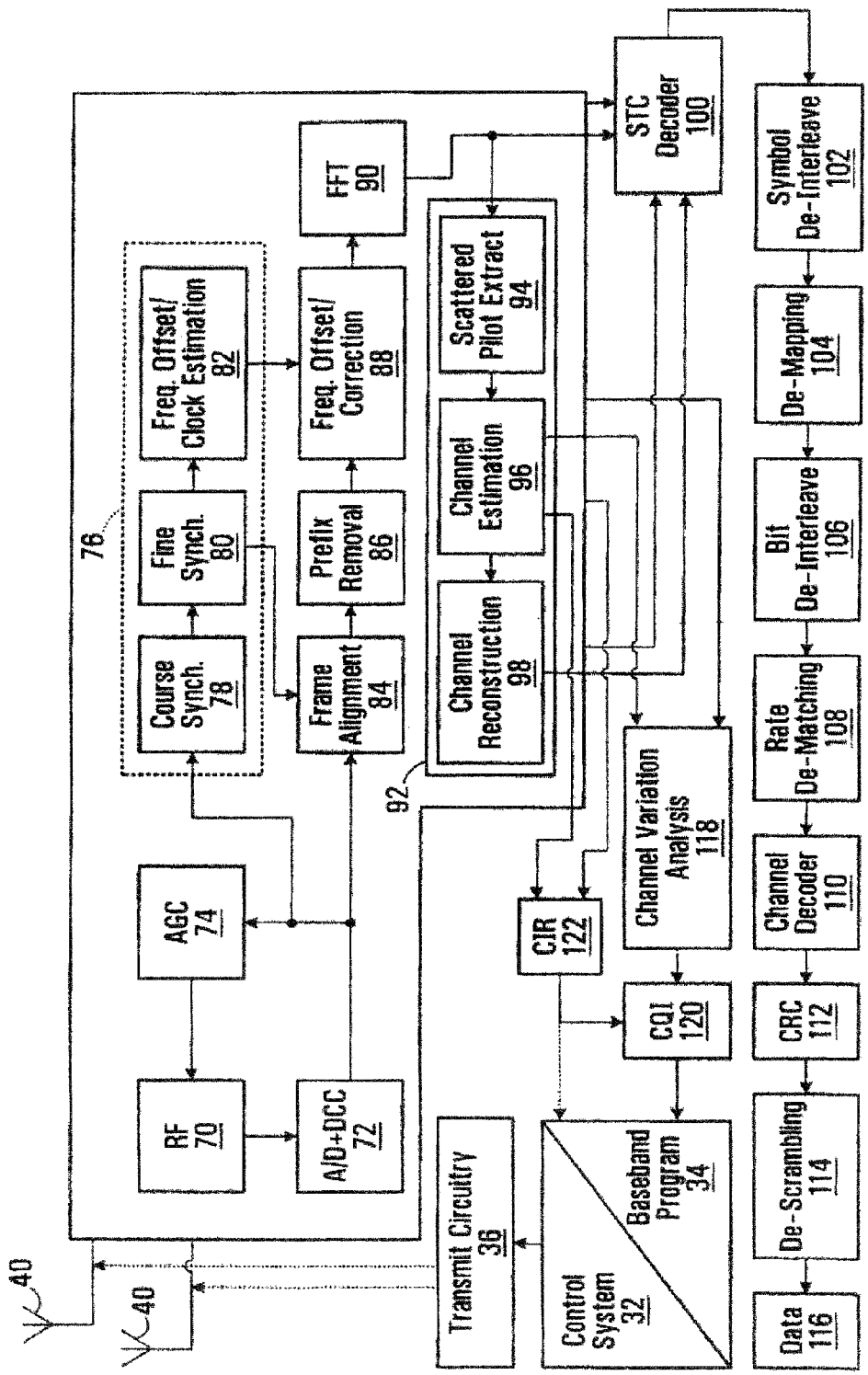
FIG. 13 is a block diagram of a logical breakdown of an example OFDM receiver architecture that might be used to implement some embodiments of the present invention.

Reference is now made to FIG. 13 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 13, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The deinterleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 9 to 13 provide one specific example of a communication system that could be used to implement embodiments of the invention. It is to be understood that embodiments of the invention can be implemented with communications systems having architectures that are different than the specific example, but that operate in a manner consistent with the implementation of the embodiments as described herein.

Figure 14A:
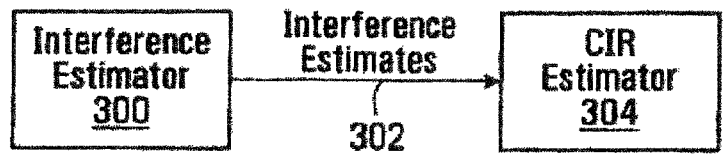
FIGS. 14A-14C are block diagrams of example apparatuses for performing CIR estimation in accordance with an embodiment of the invention.

Referring now to FIG. 14A, shown is a block diagram of an example apparatus for performing CIR estimation in accordance with an embodiment of the invention. The apparatus has an interference estimator 300 adapted to determine an interference estimate of an interference component of an OFDM signal received from a mobile station, and a CIR estimator 304 adapted to use the interference estimate to determine a carrier-to-interference ratio (CIR) for at least one sub-carrier and/or for at least one each sub-channel for the mobile station. The interference estimator 300 passes the interference estimates to the CIR estimator 304 as indicated at 302.

Figure 14B:
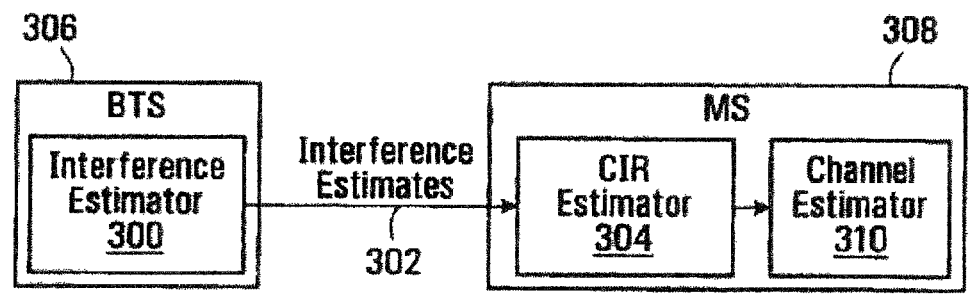

FIG. 14B is a particular implementation of the apparatus of claim 14A. The interference estimator 300 is part of a base station 306, and the CIR estimator 304 is part of a mobile station 308. The mobile station also has a channel estimator 310 that performs channel estimation of a downlink channel. The CIR estimator uses the downlink channel estimates as if they were uplink channel estimates. This assumes that there is a symmetrical channel.

Figure 14C:
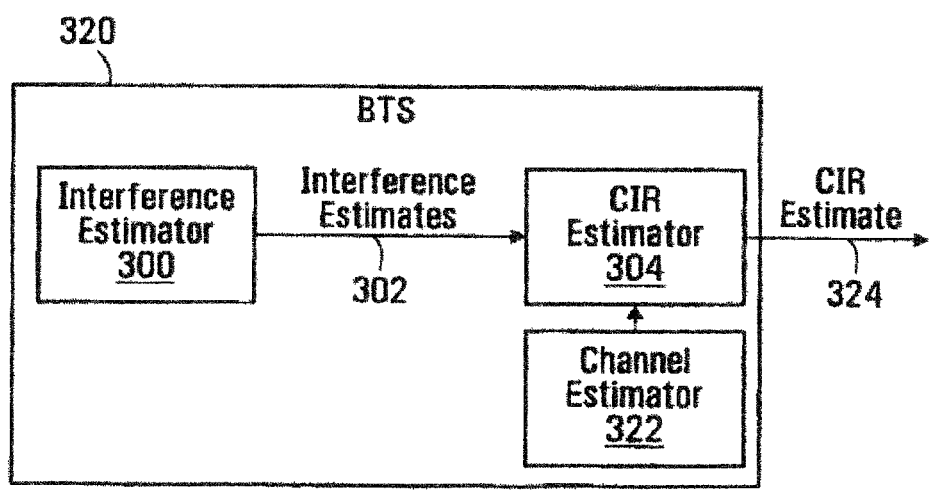

FIG. 14C is another particular implementation of the apparatus of claim 14A. The interference estimator 300 is part of a base station 320, and the CIR estimator 304 is also part of the mobile station 320. The base station 320 also has a channel estimator 322 that performs channel estimation of an uplink channel. The CIR estimator 304 uses the uplink channel estimates to produce the CIR estimates that are then forwarded at 324 to the mobile station.

For the embodiments of FIGS. 14A, 14B and 14C, a particular layout of functionality has been shown, but it is to be understood that these functions can be combined, or arranged differently than shown. The functions can be implemented using any suitable one or combination of hardware, software and/or firmware.

Numerous modifications and variations of the present invention are possible in light of the above teachings. It is therefore to be understood that within the scope of the appended claims, the invention may be practiced otherwise than as specifically described herein.

We claim:

1. A method, comprising:
determining an interference estimate of an interference component of a first Orthogonal Frequency Division Multiplexed (OFDM) signal received on a first set of subcarriers associated with a mobile station;
determining a channel response estimate of a second OFDM signal received on a second set of subcarriers associated with the mobile station, wherein the first set of subcarriers is different from the second set of subcarriers; and
estimating a carrier-to-interference ratio (CIR) for the mobile station based on the interference estimate and the channel response estimate.

2. The method of claim 1, further comprising:
selecting an adaptive modulation and coding (AMC) parameter based upon the CIR ratio for the subcarriers associated with the mobile station determined using the interference estimate and the channel response estimate.

3. The method of claim 1, wherein the first OFDM signal is received in an OFDM frame of the first set of subcarriers defined by a predetermined number of OFDM symbols.

4. The method of claim 3, wherein the interference estimate is determined using interference measurements a previous OFDM frame preceding the OFDM frame.

5. The method of claim 1, wherein the channel response estimate is determined using previous channel responses through corresponding signal strengths in the second set of subcarriers.

6. The method of claim 1, wherein the first and second sets of subcarriers associated with the mobile station are active subcarriers currently assigned to the mobile station.

7. The method of claim 1, wherein the first and second sets of subcarrieres associated with the mobile station are subcarriers under consideration for assignment to the mobile station.

8. The method of claim 1, wherein the interference estimate is an average interference level comprising estimating an interference level for a current time interval and combining the estimate for the current time interval with at least one further interference level for preceding time intervals.

9. The method of claim 1, wherein the CIR is estimated by averaging a plurality of CIRs corresponding to each subcarrier in at least one of the first set of subcarriers and the second set of subcarriers.

10. The method of claim 1, wherein:
the step of determining the interference estimate is performed at a base station;
the step of determining the channel response estimate is performed at the mobile station; and
the step of estimating the CIR is performed at the mobile station.

11. The method of claim 1, wherein:
the step of determining the interference estimate is performed at a base station;
the step of determining the channel response estimate is performed at the base station; and
the step of estimating the CIR is performed at the base station.

12. The method of claim 1, wherein:
the step of determining the interference estimate is performed at the mobile station;
the step of determining the channel response estimate is performed at the mobile station; and
the step of estimating the CIR is performed at the mobile station.

13. A mobile station, comprising:
wireless communication circuitry configured to perform wireless communication with a base station; and
processing hardware coupled to the wireless communication circuitry, wherein the processing hardware is configured to operate with the wireless communication circuitry to:
determine an interference estimate of an interference component of a first Orthogonal Frequency Division Multiplexed (OFDM) signal received on a first set of subcarriers associated with a mobile station;
determine a channel response estimate of a second OFDM signal received on a second set of subcarriers associated with the mobile station, wherein the first set of subcarriers is different from the second set of subcarriers; and
estimate a carrier-to-interference ratio (CIR) for the mobile station based on the interference estimate and the channel response estimate.

14. The apparatus of claim 13, wherein the processing hardware is further configured to:
select an adaptive modulation and coding (AMC) parameter based upon the CIR ratio for the subcarriers associated with the mobile station determined using the interference estimate and the channel response estimate.

15. The apparatus of claim 13, wherein the first OFDM signal is received in an OFDM frame of the first set of subcarriers defined by a predetermined number of OFDM symbols.

16. The apparatus of claim 13, wherein the interference estimate is determined using interference measurements a previous OFDM frame preceding the OFDM frame.

17. The apparatus of claim 13, wherein the channel response estimate is determined using previous channel responses through corresponding signal strengths in the second set of subcarriers.

18. The apparatus of claim 13, wherein the first and second sets of subcarriers associated with the mobile station are active subcarriers currently assigned to the mobile station.

19. The apparatus of claim 13, wherein the first and second sets of subcarrieres associated with the mobile station are subcarriers under consideration for assignment to the mobile station.

20. A non-transitory computer accessible memory medium storing program instructions for estimating a carrier-to-interference ratio (CIR) in an OFDM system, wherein the program instructions are executable by a processor to:
determine an interference estimate of an interference component of a first Orthogonal Frequency Division Multiplexed (OFDM) signal received on a first set of subcarriers associated with a mobile station;

determine a channel response estimate of a second OFDM signal received on a second set of subcarriers associated with the mobile station, wherein the first set of subcarriers is different from the second set of subcarriers; and estimate a carrier-to-interference ratio (CIR) for the mobile station based on the interference estimate and the channel response estimate.

* * * * *

UNITED STATES PATENT AND TRADEMARK OFFICE
CERTIFICATE OF CORRECTION

PATENT NO. : 9,871,603 B2  
APPLICATION NO. : 14/923090  
DATED : January 16, 2018  
INVENTOR(S) : Wu et al.

Page 1 of 1

It is certified that error appears in the above-identified patent and that said Letters Patent is hereby corrected as shown below:

On the Title Page

Item (63) should be replaced with the following Line:
"Continuation of application No. 13/848,317, filed on Mar. 21, 2013, now Pat. No. 9,173,114, which is a continuation of application No. 12/965,273, filed on Dec. 10, 2010, now Pat. No. 8,411,772, which is a continuation of application No. 11/791,339, filed on May 23, 2007, now Pat. No. 7,860,176, which is a national stage entry of application No. PCT/CA2005/001571, filed on Oct. 14, 2005."

In the Claims

Claim 7, Column 15, Line 48:
"sets of subcarrieres associated with the mobile station are" should read "sets of subcarriers associated with the mobile station are"

Claim 19, Column 16, Line 57:
"second sets of subcarrieres associated with the mobile" should read "second sets of subcarriers associated with the mobile"

Signed and Sealed this
Sixteenth Day of July, 2019

Andrei Iancu
*Director of the United States Patent and Trademark Office*